United States Patent
Bullock et al.

(10) Patent No.: US 11,030,650 B2
(45) Date of Patent: Jun. 8, 2021

(54) SELECTING A THIRD PARTY WEBSITE ON WHICH AN ACTION ASSOCIATED WITH A CONTENT ITEM MAY BE PERFORMED

(71) Applicant: Facebook, Inc., Menlo Park, CA (US)

(72) Inventors: William Bullock, Palo Alto, CA (US); Li Zhou, Campbell, CA (US)

(73) Assignee: Facebook, Inc., Menlo Park, CA (US)

( * ) Notice: Subject to any disclaimer, the term of this patent is extended or adjusted under 35 U.S.C. 154(b) by 224 days.

(21) Appl. No.: 15/979,332

(22) Filed: May 14, 2018

(65) Prior Publication Data
US 2019/0347689 A1   Nov. 14, 2019

(51) Int. Cl.
*G06Q 30/00* (2012.01)
*G06Q 30/02* (2012.01)
*G06N 20/00* (2019.01)

(52) U.S. Cl.
CPC ......... *G06Q 30/0254* (2013.01); *G06N 20/00* (2019.01); *G06Q 30/0242* (2013.01); *G06Q 30/0277* (2013.01)

(58) Field of Classification Search
None
See application file for complete search history.

(56) References Cited

U.S. PATENT DOCUMENTS

2003/0040958 A1\* 2/2003 Fernandes .......... G06Q 30/0255
705/14.53
2008/0275785 A1\* 11/2008 Altberg .................. G06Q 30/02
705/14.54
2009/0119167 A1 5/2009 Kendall et al.
2011/0184831 A1\* 7/2011 Dalgleish ............... G06Q 30/02
705/26.7
2013/0124344 A1 5/2013 Kolluri et al.
2016/0196579 A1 7/2016 Koura et al.
2016/0253710 A1\* 9/2016 Publicover ............ H04L 67/306
705/14.66

(Continued)

FOREIGN PATENT DOCUMENTS

WO   WO 2013/006440 A1   1/2013

OTHER PUBLICATIONS

"6 Types of Facebook Ads that Will Win Customers and Keep Them Coming Back", Apr. 6, 2016, www.shopify.com (Year: 2016).\*

(Continued)

*Primary Examiner* — Naresh Vig
(74) *Attorney, Agent, or Firm* — Fenwick & West LLP

(57) ABSTRACT

An online system receives a request from an online system user to present a content item associated with an action that may be performed on a third party website not associated with the user. The online system identifies a set of third party websites on which the action may be performed based on information provided by content publishers associated with the websites describing performances of the action on the websites. The online system predicts a likelihood a viewing user of the online system presented with the content item will perform the action on each third party website based on the information provided by the content publishers and selects a website associated with a highest predicted likelihood the viewing user will perform the action on the website. The online system generates the content item including a link to the selected website and provides the content item for presentation.

20 Claims, 4 Drawing Sheets

(56) References Cited

U.S. PATENT DOCUMENTS

2016/0269347 A1* 9/2016 Arquette ................ H04L 51/32
2016/0307235 A1   10/2016 Schoen et al.
2017/0372413 A1* 12/2017 Feuerstein ......... G06Q 30/0269

OTHER PUBLICATIONS

PCT International Search Report and Written Opinion, PCT Application No. PCT/US2018/032953, dated Feb. 13, 2019, seventeen pages.

* cited by examiner

SELECTING A THIRD PARTY WEBSITE ON WHICH AN ACTION ASSOCIATED WITH A CONTENT ITEM MAY BE PERFORMED

BACKGROUND

This disclosure relates generally to online systems, and more specifically to presentation of content associated with actions that may be performed on a third party website.

Online systems, such as social networking systems, allow online system users to connect to and to communicate with other online system users. Users may create profiles on an online system that are tied to their identities and include information about the users, such as interests and demographic information. The users may be individuals or entities such as corporations or charities. Online systems allow users to easily communicate with other users and to share content with other users by providing content items to an online system for presentation to the other users. Content items provided to an online system by a user may include declarative information about the user, status updates, check-ins to locations, images, photographs, videos, text, and/or any other information the user wishes to share with additional users of the online system. An online system may also generate content items for presentation to a user, such as content items describing actions taken by other users on the online system.

Content items presented to users of an online system are often associated with actions that may be performed by the users on websites external to the online system. For example, an online system presents a user with a content item including a link to a third party website on which the user may request information about a subject matter or topic of the content item, register to attend an event associated with the content item, purchase a product or service associated with the content item, etc. Online system users presented with a content item including a link to a third party website may navigate to the third party website by clicking or tapping on the link and perform one or more of the actions associated with the content item on the web site.

Online systems that present content items associated with actions that may be performed on third party websites are commonly provided with information by publishers of the websites describing performances of the action. For example, a content providing user of an online system who provides the online system with a content item for presentation to other online system users embeds a tracking pixel associated with the online system in an order confirmation page of a website associated with the content providing user on which a purchase associated with the content item may be made. If a purchase associated with the order confirmation page of the previous example is performed, the order confirmation page is presented and the online system receives a request for the tracking pixel included in the order confirmation page. Based on various types of information that may be included in the request for the tracking pixel, the online system determines that a purchase associated with the content item has been performed on the website associated with the content providing user from whom the content item was received.

Depending on the type(s) of information included in a request for a tracking pixel received by an online system from a client device used to access a website on which an action associated with a content item has been performed, the online system may determine various attributes associated with the performance of the action. For example, based on the received information, an online system may determine a type of action performed, a time of the performance of the action, an identity of an online system user who performed the action, and an identity of the website on which the action was performed. Information received by an online system describing actions associated with content items performed on third party websites may be utilized by the online system for various purposes. For example, an online system may utilize the received information to generate various performance metrics describing a content item's effectiveness for eliciting a particular action on a particular website. The online system of the previous example may utilize one or more of the performance metrics to optimize selection and presentation of the content item to users of the online system (e.g., to maximize a number of actions elicited) and provide the metric to an entity associated with the content item to encourage the entity to provide the online system with additional content items for presentation by the online system. An entity associated with content items described by such information may also rely on the information to tailor the content items to be more effective in eliciting the associated actions. Therefore, the receipt of accurate and complete information describing actions associated with content items presented by the online system and performed on third party websites is important.

However, in certain circumstances, it may be difficult or impossible for conventional online systems to determine accurate and complete information describing actions associated with content items performed on third party websites. For example, if a content item presented by an online system is associated with an action performed on a third party website that is not associated with a content providing user who provided the content item to the online system, the content providing user may not have a mechanism for tracking performances of the action on the third party website and therefore be unable to provide the online system with any information describing the performances of the action. Additionally, an entity associated with the third party website on which the action is performed, such as a publisher of the website, may not have incentive to provide the online system with information regarding the performance of the action since the entity is not associated with the content providing user from whom the content item was received by the online system. Further, even if the online system receives information from the third party website informing the online system that a particular action has been performed on the website, the online system may be unable to link the performance of the action with presentation of the content item due to the disconnection between the content providing user who provided the content item to the online system and the third party website on which the action was performed. As a result, many actions associated with content items performed on third party websites go unreported to the online system, diminishing an online system's ability to optimize presentation of content items to online system users and to further encourage content providing users to provide the online system with content items for presentation.

SUMMARY

An online system receives a content item from a content providing user of the online system for presentation to viewing users of the online system. The content item is associated with one or more actions that may be performed by a viewing user on any one of a set of third party websites not associated with the content providing user. Since the set of third party websites is not associated with the content providing user from whom the content item is received, information describing actions associated with the content item performed on the third party websites may not be directly available to the content providing user or the online system. Although a content publisher that publishes a third party website may provide the online system with some information describing performances of various actions on the website, the information may not include enough data from which the online system can associate the occurrences of the actions with a content item received from a content providing user who is not associated with the content publisher. For example, suppose a content item received from a content providing user describes a product of the content providing user that may be purchased on a third party website published by a merchant that is not associated with the content providing user. While a tracking mechanism (e.g., a tracking pixel) embedded in an order confirmation page of the third party website may provide an online system with enough information for the online system to determine that a purchase was made on the website, information describing a specific product purchased may be absent. As a result, the online system may be unable to link the mere occurrence of a purchase on the website to presentation of a specific content item received from a content providing user associated with the product; the online system may therefore be unable to determine whether an action associated with the content item has occurred. Thus, optimization of content item presentation and other practices of an online system and/or content providing user that are dependent on an analysis of accurate and detailed information describing performances of an action associated with the content item on third party websites may be deficient.

To encourage publishers of third party websites to provide an online system with information describing occurrences of an action associated with content items performed on the websites, the online system selects a website from a set of third party websites on which an action associated with a content item may be performed and includes a link to the website in the content item. The online system selects the website based on a predicted likelihood that a viewing user presented with the content item will perform the action on the website. The predicted likelihood that a viewing user will perform the action on a particular website is based on an analysis of information provided to the online system by a publisher of the website describing certain details about performances of the action on the website. For example, the online system trains a machine learned model to predict a likelihood that a viewing user will perform an action associated with a content item on each of a set of third party websites not associated with the content providing user based on action data received from publishers of the websites describing a number of the actions performed on each website. Thus, if the action of the preceding example is a purchase of a particular product, the online system predicts a likelihood a viewing user will purchase the product on each of the set of third party websites based on action data provided to the online system by publishers of each website describing purchases of the product on each website.

If the online system identifies an opportunity to present the content item to a viewing user, the online system selects a third party website associated with a highest predicted likelihood that the viewing user will perform the action on the website. The online system generates the content item including a link to the selected third party website and sends the content item to a client device or third party system (e.g., a content publisher external to the online system) for presentation to the viewing user. The viewing user may interact with the link to the selected website included in the content item to be directed to the website and perform the action associated with the content item on the website. Hence, a publisher of a third party website on which the action may be performed may increase a likelihood the online system will include a link to the website in a content item associated with the action, thereby directing traffic to the website, by providing information to the online system describing certain details about performances of the action on the website.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
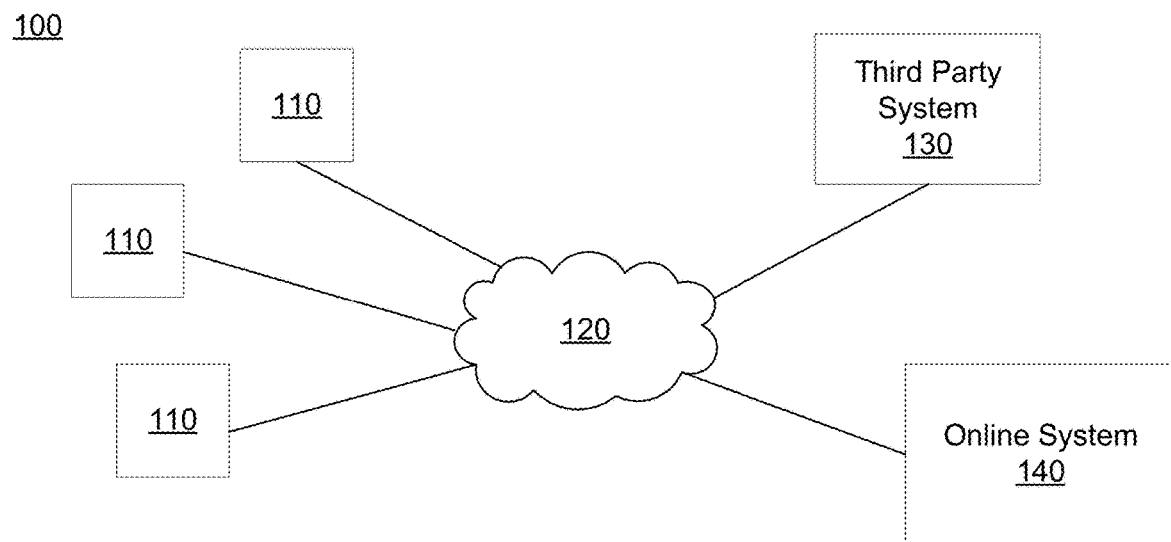
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to social networking systems that are content sharing networks or other online systems 140 providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the online system 140, such as advertisements, content, or information about an application provided by the third party system 130.

In some embodiments, one or more of the third party systems 130 provide content to the online system 140 for presentation to users of the online system 140 and provide compensation to the online system 140 in exchange for presenting the content. For example, a third party system 130 provides advertisement requests, which are further described below in conjunction with FIG. 2, including advertisements for presentation and amounts of compensation provided by the third party system 130 for presenting the advertisements to the online system 140. Other types of sponsored content may be provided by a third party system 130 to the online system 140 for presentation by the online system 140 in exchange for compensation from the third party system 130. Sponsored content from a third party system 130 may be associated with the third party system 130 or with an entity on whose behalf the third party system 130 operates.

Figure 2:
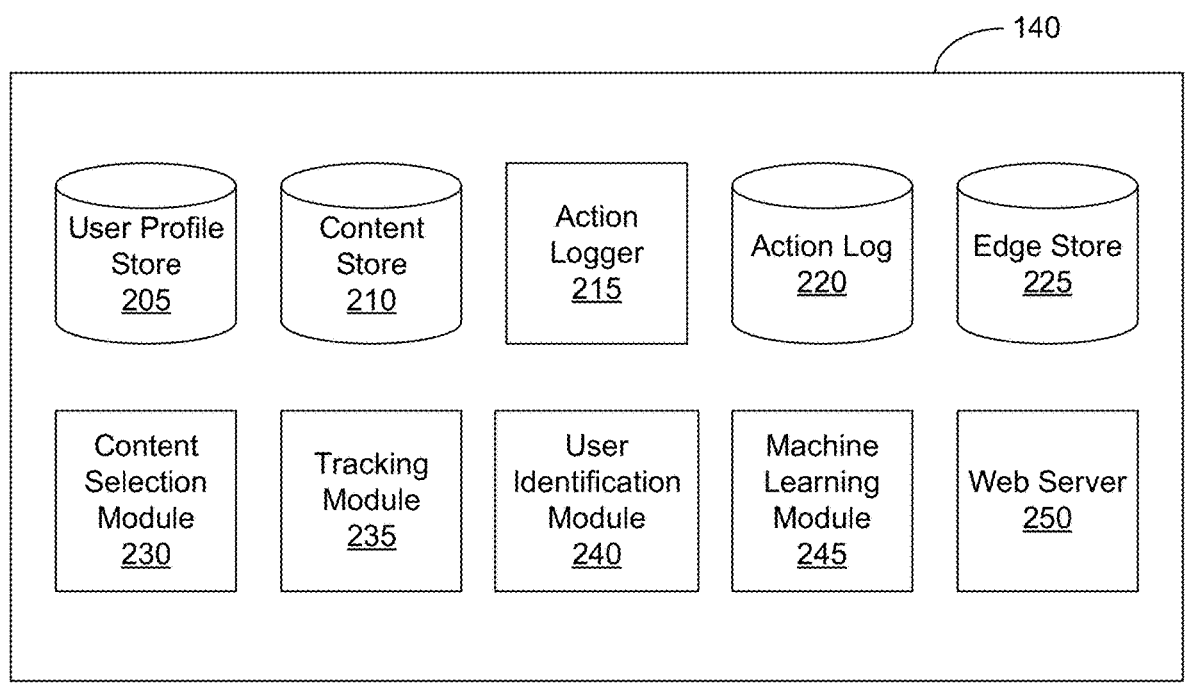
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, a tracking module 235, a user identification module 240, a machine learning module 245, and a web server 250. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity. In some embodiments, the brand page associated with the entity's user profile may retrieve information from one or more user profiles associated with users who have interacted with the brand page or with other content associated with the entity, allowing the brand page to include information personalized to a user when presented to the user.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a content providing user who provided the content item to the online system 140 and is used to determine an expected value, such as monetary compensation, provided by the content providing user to the online system 140 if content in the content item is presented to an additional user, if the content in the content item receives a user interaction when presented, or if any suitable condition is satisfied when content in the content item is presented to an additional user. For example, the bid amount included in a content item specifies a monetary amount that the online system 140 receives from a content providing user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a content providing user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the content providing user who provided the content item to the online system 140. Targeting criteria included in a content item request specify one or more characteristics of users eligible to be presented with the content item. For example, targeting criteria are used to identify users having user profile information, connections, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

In various embodiments, the action logger 215 receives action data comprising information describing user actions external to the online system 140 and stores the action data in the action log 220 along with references to users who performed the actions. In certain embodiments, action data received and logged by the action logger 215 comprises information describing various types of user actions performed on third party websites allowing the online system 140 to identify websites on which specified actions associated with content items may be and/or have been performed. For example, the action logger 215 receives action data from a client device 110 used to access a third party website on which a user action is performed. Action data describing a user action performed on a third party website received by the action logger 215 comprises information describing an identity of the website (e.g., a URL of a webpage of the website), a description of the action performed on the website (e.g., an action type identifier associated with the action), a time at which the action was performed, and a description of one or more topics and/or subtopics associated with the performed action (e.g., story identifiers, event identifiers, product identifiers, etc.). The one or more topics and/or subtopics associated with the performed action may be associated with content items presented by the online system 140. For example, a set of topics and subtopics described by action data received by the action logger 215 may describe a user-generated story associated with a content item maintained in the content store 210, an event associated with the content item, a product or service associated with the content item, etc. The action logger 215 stores the received action data in the action log 220.

In certain embodiments, action data is received by the action logger 215 via a tracking mechanism associated with the online system 140 embedded by a content publisher in one or more pages of a website published by the content publisher. For example, the tracking mechanism comprises instructions included in a webpage of a third party website by a publisher of the website that cause a client device 110 or application executing on the client device 110 presenting the webpage to send action data to the online system 140 when a user action is performed on the webpage (e.g., via a plug-in associated with the online system 140). In some embodiments, action data received by the action logger 215 is included in a request for a tracking pixel received from a client device 110 used to access a third party web site on which a user action is performed. For example, the tracking pixel is embedded in a website on which a user action is performed and is associated with various parameters that each track information included in a page of the website associated with the action, such as an action type parameter, an action topic parameter, and one or more action subtopic parameters embedded in an order confirmation page of the website. When the page is being generated for presentation (e.g., in response to a user action performed on the website), a request for the tracking pixel is communicated to the online system 140 along with the action data comprising information describing the parameters associated with the tracking pixel, which track information about the performance of the action included in the page. The action logger 215 receives and parses the request for the tracking pixel to extract information comprising the action data and stores the extracted action data in the action log 220.

In other embodiments, the action logger 215 extracts action data from information stored at a client device 110 (e.g., in a cookie) used to access a third party website on which a user action is performed. For example, a web browser used to access a third party website on which a user action is performed stores action data describing various details about performances of user actions in a cookie at a client device 110 on which the browser is executing in response to instructions included in the website by a publisher of the website. The action data stored at the client device 110 comprises information including at least a description of the third party website on which the user action was performed, a description of the performed action, a time at which the action was performed, and a description of one or more topics and/or subtopics associated with the performed action. The action data is communicated to the online system 140 when an individual using the client device 110 on which it is stored logs in to the online system 140 via the client device 110 or at various pre-determined time intervals. The action logger 215 extracts the action data from the stored information (e.g., from a cookie) and stores the action data in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

In some embodiments, the action logger 215 receives communications about user actions with content presented to a user and populates the action log 220 with information about the actions. Examples of interactions with content include viewing content items, requesting additional content items for presentation, indicating a preference for a content item, sharing a content item with another user, or performing any other suitable action. A user may interact with content items by providing inputs to a client device 110 presenting content from the online system 140. The client device 110 identifies actions corresponding to various provided inputs and communicates information describing the identified actions to the action logger 215, which stores the information describing the identified actions in the action log 220.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In certain embodiments, information stored in the action log 220 describing user actions taken on a third party system 130 comprises action data received by the action logger 215. As described above, action data received by the action logger 215 and stored in the action log 220 is information provided by a content publisher associated with a third party website describing various types of user actions performed on the third party website. In various embodiments, information comprising action data provided by a content publisher includes an amount of detail that is sufficient to allow the online system 140 to identify a website on which a user action may be and/or has been performed and to associate the user action with a content item presented by the online system 140. For example, action data received from a client device 110 used to access a third party website on which a user action is performed includes information describing at least an identity of the website (e.g., a URL of a webpage of the website), a description of the user action performed on the website (e.g., an action type identifier associated with the action), a time at which the action was performed, and a description of one or more topics and/or subtopics associated with the performed action (e.g., a story identifier, an event identifier, a product identifier, a service identifier, etc.). In various embodiments, action data may be stored in the action log 220 along with references to users identified by the user identification module 240 as individuals who performed the actions.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features that each represent characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or a particular user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Information associated with the user included in the user profile store 205, in the action log 220, and in the edge store 225 may be used to determine the measures of relevance. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having a highest positions in the ranking or having at least a threshold position in the ranking for presentation to the user.

Content items eligible for presentation to the user may include content items associated with bid amounts. The content selection module 230 uses the bid amounts associated with ad requests when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the bid amount associated with the content item and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content (also referred to as a "content feed") to a user of the online system 140. The feed may include one or more content items associated with bid amounts (i.e., "sponsored content items") as well as organic content items, such as stories describing actions associated with other online system users connected to the user. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a feed including a plurality of content items selected for presentation to the user. One or more content items associated with bid amounts may be included in the feed. The content selection module 230 may also determine an order in which selected content items are presented via the feed. For example, the content selection module 230 orders content items in the feed based on likelihoods of the user interacting with various content items.

The tracking module 235 generates tracking mechanisms used by the online system 140 to track presentations of content to individuals by third-party systems 130 and user actions performed on websites presented by the third party system 130. Examples of tracking mechanisms include tracking pixels embedded in webpages of third party websites presenting the content to the individuals and cookies stored at client devices 110 used by the individuals to access the websites. In various embodiments, tracking mechanisms generated by the tracking module 235 communicate action data to the online system 140 describing presentations of content by a third party system 130 and actions performed on websites presenting the content. For example, the tracking module 235 generates code comprising a tracking pixel embedded by a publisher of a third party website in a page of the website associated with an action that may be performed by an individual on the website. The tracking pixel is associated with a set of action event parameters (e.g., an action type parameter, an action topic parameter, an action subtopic parameter, etc.) that track information associated with a performance of the action included in the page. When the page is generated for presentation (e.g., in response to a performance of the action on the website), a request for the tracking pixel embedded in the page is communicated to the online system 140 along with the action data comprising information describing the set of action parameters associated with the tracking pixel. Based on the information tracked by the set of action parameters associated with the tracking pixel, the online system 140 determines various types of information about the performance of the action on the website (e.g., a type of action performed, a description of an item purchased, etc.), as further described below in conjunction with FIGS. 3-5.

In various embodiments, the user identification module 240 identifies individuals who are online system users. The individuals may include individuals presented with a content item and/or individuals who performed various actions in association with being presented with a content item, including actions performed on websites external to the online system 140. In various embodiments, the user identification module 240 identifies individuals who are online system users based on user-identifying information received from client devices 110 used by the individuals to access content presented by the online system 140 and/or third party systems 130. Example types of user-identifying information used by the user identification module 240 to identify individuals include online system user identifiers associated with online system users and IP addresses associated with client devices 110 used by the online system users to access content presented by the online system 140 or a third party system 130 and/or to perform an action on the online system 140 or third party website.

In certain embodiments, the user identification module 240 identifies individuals who are online system users based on comparisons of user-identifying information stored at the online system 140 to user-identifying information obtained from a client device 110 or from action data received from the client device 110. For example, suppose the action logger 215 receives action data from a client device 110 describing an action performed by an individual on a third party website. The user identification module 240 obtains information from the client device 110 describing an IP address associated with the client device 110 and compares the IP address to IP addresses associated with various online system users. For example, an IP address associated with an online system user identifies a client device 110 used by the user to access the online system 140 and is described by information stored in the user profile store 205 in association with an account of the user on the online system 140. If the IP address described by the obtained information matches an IP address associated with an online system user, the user identification module 240 identifies the individual who performed the action on the third party website as the online system user. In various embodiments, user-identifying information obtained by the user identification module 240 is stored in the action log 220 along with a reference to an identified online system user in association with action data describing an action performed by the user.

The machine learning module 245 trains one or more machine learned models to predict a likelihood that an online system user presented with a content item will perform an action associated with the content item on a website external to the online system 140. In various embodiments, the content item may be received by the online system 140 from a content providing user that is not associated with a third party website on which the action associated with the content item may be performed. Upon identifying an opportunity to present the content item to a viewing user, the online system 140 provides a set of input features (e.g., describing various attributes associated with the viewing user, the content item, a third party website, etc.) to a machine learned model, which predicts a likelihood the viewing user will perform the action on the third party website. In various embodiments, if there is at least a threshold predicted likelihood the viewing user will perform the action on the third party website, the online system 140 includes a link to the website in the content item. The content item may then be sent to a client device 110 or third party system 130 (e.g., a content publisher external to the online system 140) for presentation to the viewing user, in certain embodiments.

In various embodiments, the machine learning module 245 trains a machine learned model to predict a likelihood that an online system user will perform a specified action on a specified website using training data comprising action data retrieved from the action log 220. Action data used by the machine learning module 245 as training data comprises information received by the online system 140 describing identities of third party websites on which actions were performed by various individuals (e.g., URLs of webpages of the websites), types of actions performed on the websites (e.g., action type identifiers associated with the actions), times at which the actions were performed, and descriptions of topics associated with the performed actions (e.g., story identifiers, event identifiers, product identifiers, service identifiers, etc.). For example, training data used by the machine learning module 245 to train a machine learned model to predict a likelihood that an item will be purchased on a website describes the item, websites on which purchases of the item were made, a percentage of individuals who visited a website and made a purchase of the item on the website, times at which purchases of the item were made on the websites, and a number of purchases of the item made on each website.

The machine learning module 245 derives features (e.g., features describing performances of the action on each website and/or features describing each website) from the retrieved action data and determines values of the features. For example, values of features derived from the action data by the machine learning module 245 describe a number of presentations of a website during a specified period of time, a number of requests received at the website for information about a particular topic (which may be a topic associated with a content item presented by the online system 140)

during the specified period of time, an amount of purchases on the website of a particular product or service during the specified period of time, and/or an amount of time between a presentation of the website to a set of individuals and a purchase by the set of individuals of the product or service during the specified period of time. The machine learning module 245 may use one or more machine learning algorithms to train the machine learned model based on determined relationships and strengths of relationships among the feature values. In various embodiments, one or more machine learning algorithms used by the machine learning module 245 to train the machine learned model include a clustering algorithm, a decision tree learning algorithm, a random forest algorithm, a logistic regression algorithm, a linear regression algorithm, etc.

In some embodiments, the machine learning module 245 also trains the machine learned model to predict a likelihood a user will perform a specified action on a specified website using training data comprising values of features derived from information maintained by the online system 140 describing users who performed the action. For example, the machine learning module 245 retrieves information stored in association with online system user accounts associated with a set of users identified by the user identification module 240 as individuals who performed the action on a set of third party websites. Based on the retrieved information, the machine learning module 245 identifies values of features derived from information stored in association with the online system user accounts associated with the set of users describing various attributes of the users. In various embodiments, values of features describing various attributes of the set of users describe information shared by the users on the online system 140 and actions performed by the users on the online system 140 and/or on one or more third party systems 130. For example, the identified feature values describe demographic information about the users, declared interests of the users, connections between the users and additional online system users and/or objects on the online system 140, visits by the users to third party websites, and actions performed by the users on the online system 140 and/or on third party websites. The machine learning module 245 may train the machine learned model based on determined relationships and strengths of relationships among feature values describing various websites and performances of the action on the websites in combination with feature values describing users who performed the action on the websites. Various machine learning algorithms may be used to train the machine learned model based on the combination of feature values describing various websites, performances of the action on the websites, and users who performed the action on the websites, as described above.

In various embodiments, the online system 140 derives values describing one or more attributes of a viewing user to provide as inputs to the trained machine learned model to predict a likelihood that the user will perform a specified action on a specified website. For example, the machine learning module 245 retrieves information stored at the online system 140 in association with an online system user account associated with a viewing user (e.g., in the user profile store 205) and derives features from the information comprising values describing various attributes of the user. In some embodiments, values describing various attributes of the viewing user identified by the machine learning module 245 describe information shared by the user on the online system 140 and actions performed by the user on the online system 140 and/or on one or more third party systems 130. For example, the values describe demographic information about the viewing user, declared interests of the user, connections between the user and additional online system users and/or objects on the online system 140, visits by the user to third party websites, and actions performed by the user on the online system 140 and/or on third party websites.

In some embodiments, the machine learning module 245 identifies additional values that may be used by the machine learned model as input features. The additional values may include input features describing one or more attributes of the specified action, one or more websites on which the action may be performed, a content item associated with the action, and/or a content providing user from whom the request to present the content item was received 300. Additional input features that may be identified by the machine learning module 245 describe information received by the online system 140 from various entities associated with third party websites that may be dynamically updated, such as information describing an availability of a specified product or service at a merchant associated with the websites.

Once trained, the machine learned model may be used to predict a likelihood that a user will perform an action on a set of third party websites. For example, using a set of input values describing a gender and age of a user, actions performed by the user on the online system 140 during a specified period of time, an action that may be performed on a set of third party websites by the user, and a content item associated with the action, the machine learned model outputs a predicted likelihood that the user will perform the action on each website of the set of third party websites. In this example, the predicted likelihood is based on relationships and strengths of relationships among the input values and correlations among the input values, values describing the set of websites and previous performances of the actions on the set of websites derived from stored action data and values describing users who performed the action on the set of websites. In various embodiments, the predicted likelihood that a user will perform an action on a website may be expressed as a percentage, a ratio, a score, etc. Utilizing a machine learned model to predict a likelihood that a user will perform a specified action on a specified website is described in more detail below in conjunction with FIGS. 3-4.

The web server 250 links the online system 140 via the network 120 to the one or more client devices 110, as well as to the one or more third party systems 130. The web server 250 serves web pages, as well as other content, such as JAVA®, FLASH®, XML and so forth. The web server 250 may receive and route messages between the online system 140 and the client device 110; for example, the messages are instant messages, queued messages (e.g., email), text messages, short message service (SMS) messages, or messages sent using any other suitable messaging technique. A user may send a request to the web server 250 to upload information (e.g., images or videos) that are stored in the content store 210. Additionally, the web server 250 may provide application programming interface (API) functionality to send data directly to native client device operating systems, such as IOS®, ANDROID™, WEBOS® or BlackberryOS.

In various embodiments, the web server 250 receives information describing actions performed by individuals including online system users on the online system 140 and on various third-party systems 130. For example, the web server 250 receives the information via one or more tracking mechanisms associated with the online system 140 and/or third-party systems 130 on which the actions are performed by the individuals. In some embodiments, the web server 250 receives action data describing actions performed by individuals on third party websites included in requests for tracking pixels received from client devices 110 used to access the third party websites. In other embodiments, the web server 250 receives action data describing actions performed by individuals on third party websites via cookies including the action data stored at client devices 110 used to access the third party websites. Upon receiving action data describing actions performed by individuals on third party websites, the web server 250 communicates the action data to the action logger 215, which stores the information in the action log 220 for later retrieval and analysis, in some embodiments.

Figure 3:
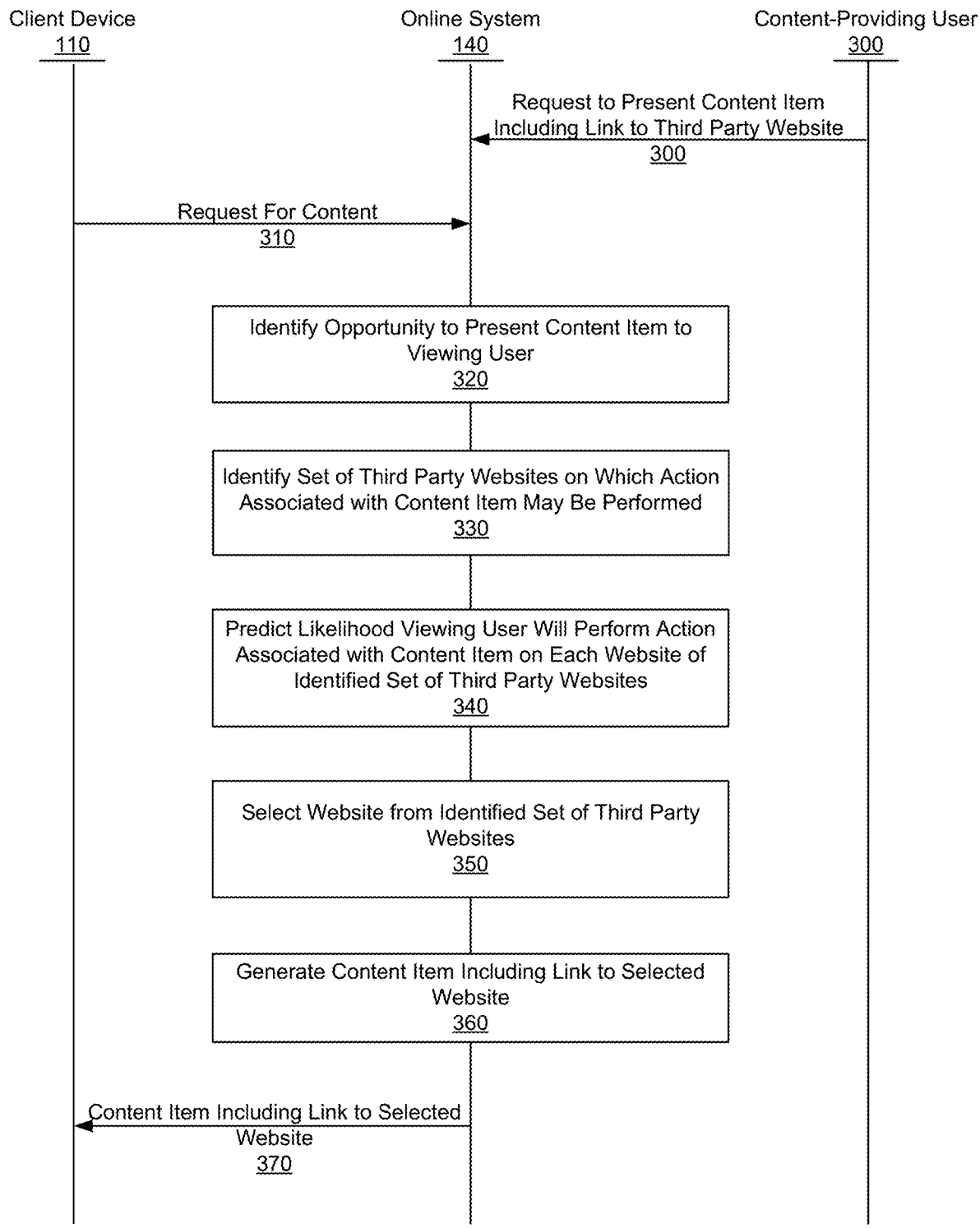
FIG. 3 is an interaction diagram illustrating a method for selecting a third party website on which an action associated with a content item may be performed, in accordance with an embodiment.

Selecting a Third Party Website on which an Action Associated with a Content Item May Be Performed FIG. 3 is an interaction diagram illustrating a method for selecting a third party website on which an action associated with a content item may be performed. In other embodiments, the method may include different and/or additional steps than those shown in FIG. 3. Additionally, steps of the method may be performed in different orders than the order described in conjunction with FIG. 3 in various embodiments.

In various embodiments, the online system 140 receives 300 a request from a content providing user of the online system 140 to present viewing users with a content item including a link to a third party website selected by the online system 140 from a set of third party websites on which an action associated with the content item may be performed. For example, the online system 140 receives 305 a request from a content providing user to present viewing users meeting certain criteria with photos, videos and/or text describing a product or service associated with the content providing user and a link to a website selected by the online system 140 from a set of third party websites on which the product or service may be purchased. In some embodiments, the content item is an organic content item, such as a user generated story, while in other embodiments, the content item is a sponsored content item for which the online system 140 receives compensation in exchange for presenting to a viewing user. In various embodiments, the website on which the action associated with the content item may be performed is not associated with the content providing user. For example, the website is a third party website associated with a retailer that sells items manufactured by an entity associated with the content providing user but is not otherwise associated with the entity or content providing user.

In various embodiments, the request to present the content item received 300 from the content providing user includes information describing a subject matter of the content item comprising one or more topics and/or subtopics (e.g., an event, a story, a product, a service, etc.), targeting criteria describing viewing users eligible to receive the content item (e.g., a list of attributes associated with viewing users eligible to receive the content item), and an action which may be performed by the viewing users on a third party website in response to being presented with the content item (e.g., a request for information associated with the content item, a purchase of a product or service associated with the content item, registration for an event associated with the content item, etc.). In some embodiments, the request to present the content item also includes information describing one or more third party websites not associated with the content providing user on which the action associated with the content item may be performed by the viewing users. For example, the request includes a list of third party websites not associated with the content providing user on which a purchase associated with the content item may be performed. The online system 140 stores the received request to present the content item and information included in the request for later retrieval.

Upon identifying 320 an opportunity to present the content item to a viewing user, the online system 140 retrieves stored information received with the request to present the content item and identifies 330 a set of third party websites on which an action associated with the content item may be performed based at least in part on the retrieved information. In various embodiments, the online system 140 identifies 320 the opportunity to present the content item to the viewing user upon receiving 310 a request from the viewing user to be presented with content by the online system 140. For example, the online system 140 identifies 320 the opportunity to present the content item to the viewing user upon receiving 310 a request from the viewing user to access an account on the online system 140 associated with the viewing user or to access a newsfeed associated with the viewing user's account on the online system 140. In some embodiments, the online system 140 identifies 320 the opportunity to present the content item to the viewing user upon determining that the viewing user has at least a threshold predicted affinity for the content item. For example, the online system 140 determines the viewing user has at least a threshold predicted affinity for the content item if a user account on the online system 140 associated with the viewing user is associated with at least a threshold number of attributes described by targeting criteria included in the content providing user's request to present the content item.

In some embodiments, the online system 140 identifies 330 one or more of the set of third party web sites on which the action associated with the content item may be performed based on a list of websites provided by the content providing user to the online system 140 (e.g., with the request to present the content item). For example, the online system 140 retrieves stored information received along with the request to present the content item and identifies 330 a list of websites on which the action associated with the content item may be performed based on the retrieved information. In other embodiments, the online system 140 identifies 330 one or more of the set of third party websites based on information included in the request to present the content item describing a topic and action associated with the content item, and additional information determined by the online system 140 describing third party websites presenting various types of content associated with the topic. For example, if a topic of the content item is a product of the content providing user and the action associated with the content item is a purchase of the product, the online system 140 identifies 330 a set of third party websites on which the product may be purchased based on a survey of websites presented by various content publishers not associated with the content providing user.

In various embodiments, the online system 140 identifies 320 the set of third party websites on which the action associated with the content item may be performed based at least in part on action data provided to the online system 140 by content publishers presenting the third party websites. Action data provided to the online system 140 by a content publisher comprises information describing various types of actions performed on a third party website with an amount of detail that is sufficient to allow the online system 140 to identify 320 the website as a website on which the action associated with the content item may be and/or has been performed. In various embodiments, action data provided to the online system 140 by a content publisher is received from various client devices 110 used to access third party websites on which various actions are performed, and includes information identifying the websites (e.g., URLs of webpages of the websites), types of actions performed on the websites (e.g., action type identifiers associated with the actions), times at which the actions were performed, and descriptions of one or more topics and/or subtopics associated with the performed actions (e.g., story identifiers, event identifiers, product identifiers, service identifiers, etc.). Based on action data provided to the online system 140 by various content publishers, the online system 140 identifies 330 a set of third party websites on which the action associated with the content item was performed (e.g., during a specified period of time).

As an example, suppose a content publisher provides the online system 140 with action data identifying a website presented by the content publisher, an action performed by an individual on the website (e.g., registering to attend an event), and a topic associated with the performed action (e.g., "2018 Silicon Valley Auto Show"). The online system 140 compares the identified action and topic to an action and topic described by information included in the request to present the content item received 300 from the content providing user. If the identified action and topic correspond to an action and topic described by the information included in the received request to present the content item, the online system 140 identifies the website as a website on which the action associated with the content item may be performed and includes the website in the set of third party websites. Hence, information comprising action data provided to the online system 140 by content publishers allows the online system 140 to identify 330 third party websites described in the action data as third party websites on which the action associated with the content item may be performed.

In various embodiments, action data is provided to the online system 140 by a content publisher presenting a third party website via a tracking mechanism associated with the online system 140 embedded by the content publisher in one or more pages of the website. For example, the tracking mechanism comprises instructions (i.e., code) included in a webpage of a third party web site that cause a client device 110 or application executing on the client device 110 presenting the webpage to send information comprising action data to the online system 140 when certain actions are performed on the website.

In some embodiments, action data is provided to the online system 140 by a content publisher via a request for a tracking pixel received from a client device 110 used to access a third party website on which the action is performed. In certain embodiments, the online system 140 provides a tracking pixel associated with the online system 140 to a content publisher presenting a third party website on which an action (e.g., the action associated with the content item) may be performed. The tracking pixel is associated with certain details about the action and is embedded in a page of the website associated with the action, such as a page presented in response to a performance of the action on the website. The tracking pixel is associated with a set of parameters (e.g., an action type, an action topic, one or more action subtopics, etc.) that track information included in the page of the website associated with the action. When the page is generated for presentation (e.g., in response to a performance of the action on the website), a request for the tracking pixel embedded in the page is communicated to the online system 140 along with action data comprising information describing the set of parameters associated with the tracking pixel which track information about the performance of the action included in the page. The online system 140 parses the request for the tracking pixel to extract the action data and compares information comprising the action data to information included in the content providing user's request to present the content item. Based on the comparison, the online system 140 determines whether an action and topic described in the action data correspond to an action and topic associated with the content item. If the action and topic described in the action data correspond to an action and topic associated with the content item, the online system 140 identifies 330 the website as a third party website on which the action associated with the content item may be performed and includes the website in the set of third party websites.

Figure 4:
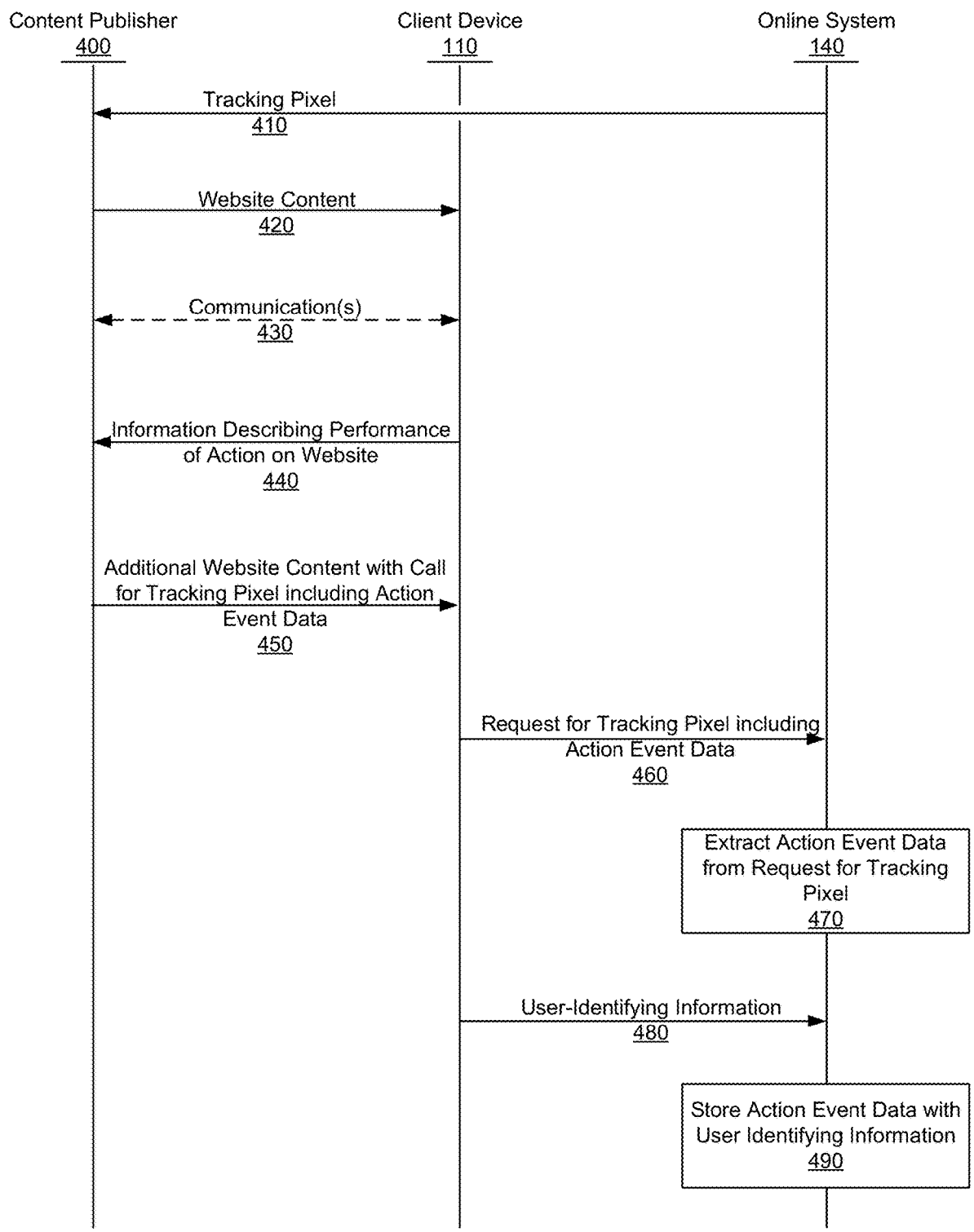
FIG. 4 is an interaction diagram illustrating receiving action data describing a performance of an action associated with a content item on a third party website, in accordance with an embodiment.
Figure 5:
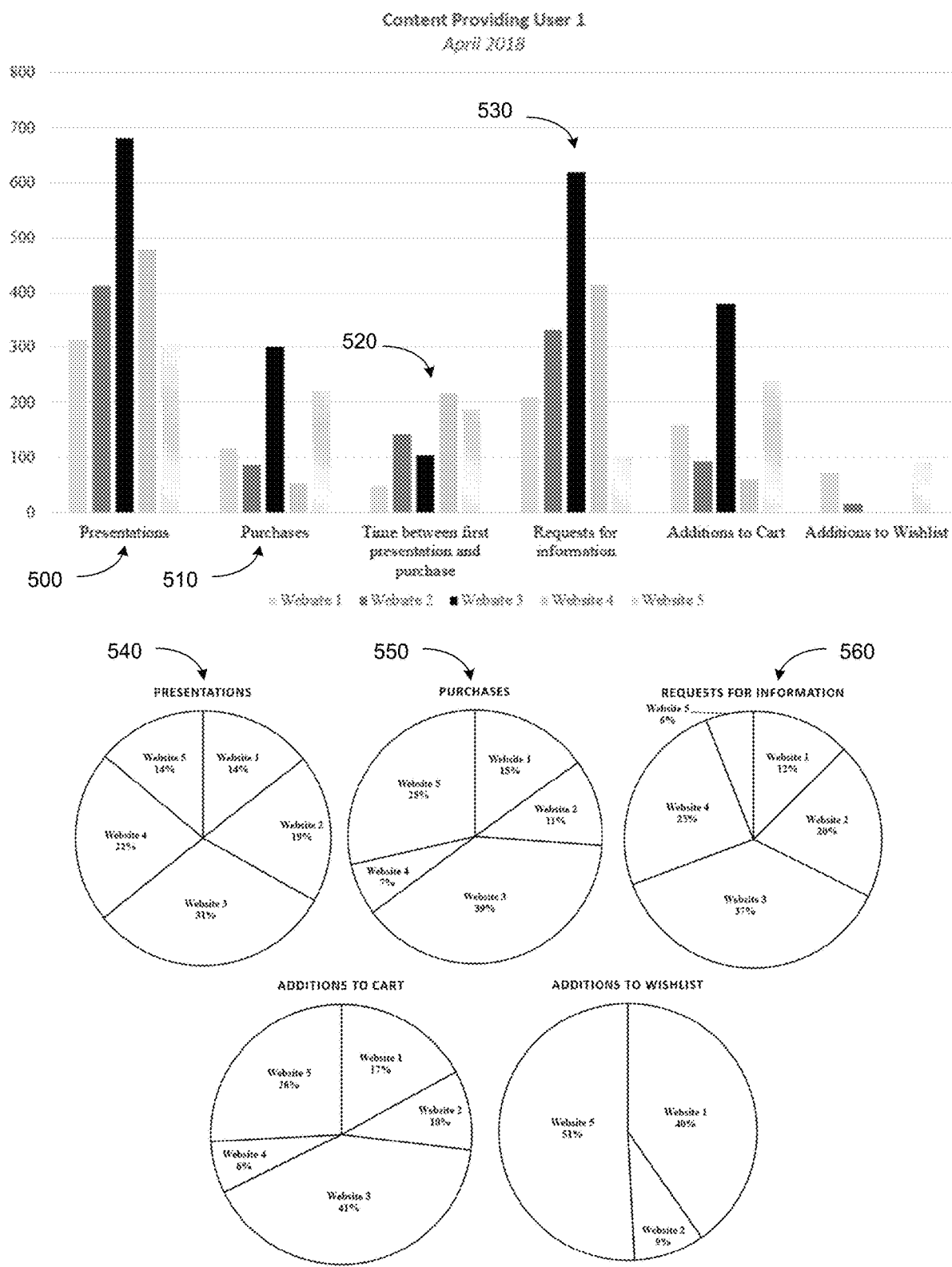
FIG. 5 illustrates example metrics generated by the online system describing performances of an action associated with a content item on a set of third party websites, in accordance with an embodiment.

FIG. 4 is an interaction diagram illustrating an example process by which the online system 140 receives action data describing a performance of an action associated with the content item on a third party website from a client device 110 used to access the third party website. In this example, the online system 140 provides 410 a tracking pixel to a content publisher 400 (e.g., a third party merchant) who publishes a website on which a purchase of an item associated with the content item may be performed. The tracking pixel is embedded by the content publisher 400 in a webpage of the website presented in response to a performance of the action on the website. For example, the tracking pixel is embedded in an order confirmation page of the website presented upon completion of a purchase of the item on the website. The tracking pixel is associated with various parameters including an action type and a set of action topics and subtopics that track information included in the webpage in which it is embedded. For example, the action type parameter tracks information included in an order confirmation page identifying a purchase of a product on the website, an action topic parameter tracks information included in the page identifying a type of the purchased product, an action subtopic parameter tracks information included in the page describing a brand of the purchased product, and an additional action subtopic parameter tracks information included in the page describing a model of the purchased product. Additional subtopic parameters associated with the tracking pixel may include various details about the purchased product, such as a Universal Product Code number, size, color, material, quantity, price, etc.

If an individual visits the third party website, the content publisher 400 provides 420 website content to the client device 110 used to access the website and various communications may be sent 430 between the client device 110 and the content publisher 400. For example, the viewing user may browse catalogs of information included in various webpages of the website and communications describing the viewing user's browsing activity and communications generated in response to the activity are sent 410 between the content publisher 400 and the client device 110. If the viewing user performs the action associated with the content item on the third party website, information describing the performance of the action is communicated 440 to the content publisher 400. For example, if the viewing user purchases an item associated with the content item on the third party website, information describing the purchase and purchased item is sent 440 to the content publisher 400.

In response to receiving 440 information describing the performance of the action on the website, the content publisher 400 delivers 450 additional website content comprising a webpage associated with the performance of the action to the client device 110. The webpage delivered 450 to the client device 110 includes a call for the tracking pixel embedded in the webpage. For example, the call for the tracking pixel includes instructions that cause the browser presenting the webpage to communicate 460 a request to the online system 140 for the tracking pixel along with information comprising action event data describing the set of parameters associated with the tracking pixel. Upon receiving 450 the additional website content including the call for the tracking pixel, the client device 110 communicates 460 a request for the tracking pixel to the online system 140 along with the information comprising the action event data describing the set of parameters associated with the tracking pixel.

The online system 140 receives 460 the request for the tracking pixel and extracts 470 action data from the request comprising the information tracked by the set of parameters associated with the tracking pixel. Based on the extracted action data, the online system 140 determines an identity of the third party website, a specific action performed on the website, and various attributes of a topic associated with the action. For example, based on the action data extracted 470 from the request for the tracking pixel, the online system 140 identifies the performed action as a purchase of a product and also identifies various attributes of the purchased product (e.g., brand, model, style, color, size, quantity, price, etc.). If the identified action and attributes of the topic associated with the action correspond to an action and one or more attributes of a topic associated with the content item, the online system 140 identifies 330 the website as a third party website on which the action associated with the content item may be performed and includes the website in the identified set of third party websites.

In another embodiment, the online system 140 provides 410 a content publisher 400 associated with a third party website on which different actions may be performed with one or more tracking pixels that are each associated with an action and an interactive element of the website. In such embodiments, each interactive element and one or more tracking pixels associated with each interactive element are associated with different actions that may be performed on the website by interacting with the element. When an interaction with an interactive element is performed, a request for the tracking pixel associated with the interactive element is communicated 460 to the online system 140 along with action data describing certain details about the action performed by the interaction. The online system 140 parses the request for the tracking pixel to extract 470 information comprising the action data describing the performed action and compares the extracted information to information associated with the content item received from the content providing user. Based on the comparison, the online system 140 determines whether an action and topic associated with the action described in the action data correspond to an action and topic associated with the content item. If the action and topic described in the action data correspond to an action and topic associated with the content item, the online system 140 adds the website to the set of third party websites.

As a detailed example, the online system 140 provides 410 a content publisher 400 who publishes a third party website with different tracking pixels that are each associated with an interactive element presented on the website. For example, the interactive elements presented on the website include an "add to cart" button, a "submit order" button, etc. Each tracking pixel is associated with a set of parameters that track information included in a webpage on which an interactive element associated with the tracking pixel is presented. For example, a tracking pixel associated with a "submit order" button is associated with an "action type" parameter that tracks information identifying a purchase of a product performed on the webpage, an "action topic" parameter that tracks information describing a type of the product, an "action subtopic" parameter that tracks information describing a brand of the product, and an additional "action subtopic" parameter that tracks information describing a model of the product. Additional "action subtopic" parameters associated with the tracking pixel may track additional details about the product, such as a Universal Product Code number, size, color, material, quantity, price, etc. When an interaction with the "submit order" button is performed (e.g., the button is clicked), a request for the tracking pixel associated with the button including action data comprising the information tracked by the associated set of parameters is sent 460 to the online system 140. The online system 140 receives 460 the request for the tracking pixel and parses the request to extract 470 the action data describing the action performed by the interaction (e.g., a purchase of the product). If the action associated with the content item is a purchase of the product, the online system 140 identifies 330 the website as a website on which the action associated with the content item may be performed and includes the website in the identified set of third party websites.

In other embodiments, the online system 140 extracts action data from information stored at a client device 110 (e.g., by an application executing on the client device 110) used to access a third party website on which an action is performed. For example, a web browser used to access a third party website on which an action is performed stores action data describing various details about the performance of the action in a cookie at a client device 110 on which the browser is executing. In this example, the web browser stores the action data in a cookie at the client device 110 in response to instructions included in a webpage of the website by a content publisher that cause the web browser to store information describing certain details about performances of an action on the website at the client device 110. Action data comprising the information stored at the client device 110 includes at least a description of a third party website on which the action was performed, a description of the performed action, a time at which the action was performed, and a description of one or more topics and/or subtopics associated with the performed action. The action data is communicated to the online system 140 when an individual using the client device 110 on which it is stored logs in to the online system 140 via the client device 110 or at various pre-determined time intervals. If the description of the performed action and the topic associated with the performed action included in the action data correspond to a description of the action and topic associated with the content item, the online system 140 identifies 330 the website as a website on which the action associated with the content item may be performed and includes the website in the identified set of third party websites.

Upon receiving 460 action data describing a performance of an action on a third party website, the online system 140 obtains user-identifying information associated with an individual who performed the action and/or a client device 110 on which the action was performed. As shown in FIG. 4, the online system 140 retrieves 480 user-identifying information from a client device 110 from which action data is received, in some embodiments. In other embodiments, the user-identifying information is included in the received action data. User-identifying information obtained by the online system 140 is information from which the online system 140 may identify an individual who performed an action described by the action data as an online system user. For example, user-identifying information included in the action data or retrieved 480 from a client device 110 from which action data is received includes a description of an IP address associated with the client device 110. As another example, user-identifying information retrieved 480 from a client device 110 from which action data is received includes an online system user identifier associated with an account on the online system 140 associated with an online system user and stored in a cookie at the client device 110 by the online system 140.

In various embodiments, the online system 140 compares the obtained user-identifying information to user-identifying information stored at the online system 140 in association with various online system user accounts. For example, the online system 140 compares an online system user identifier and/or IP address received from a client device 110 to an online system user identifier and/or IP address described by information stored in the user profile store 205 in association with various user accounts maintained by the online system 140. Based on the comparisons, the online system 140 identifies online system users who performed the action(s) described by the received action data. For example, if the online system 140 determines that user-identifying information included in action data matches user-identifying information stored in association with an online system user's account on the online system 140, the online system 140 identifies the individual who performed an action described in the action data as the online system user associated with the user account. In various embodiments, the online system 140 stores 490 information describing online system users identified as individuals who performed an action described by action data in association with the action data. For example, user-identifying information is stored 490 along with a reference to an identified online system user and the action data describing the action performed by the user in the action log 220. The stored information is later retrieved and analyzed by the online system 140 to predict a likelihood that the viewing user will perform the action associated with the content item on each website of the identified set of third party websites, as described below.

Returning to FIG. 3, upon identifying 330 the set of third party websites, the online system 140 predicts 340 a likelihood that the viewing user will perform the action associated with the content item on each website of the set of third party websites. In various embodiments, the predicted likelihood is based at least in part on information comprising the received action data describing previous performances of the action on each website. For example, the online system 140 derives features from the action data comprising values describing each website and previous performances of the action on each website, which are then used as training data to train the machine learned model to predict 340 a likelihood the viewing user will perform the action on each website. In certain embodiments, values of features derived from the action data describe a number of presentations of a website during a specified period of time, a number of requests received at the website for information about a topic associated with the content item during the specified period of time, an amount of purchases on the website of a product or service associated with the content item during the specified period of time, and/or an amount of time between a presentation of the website to a set of individuals and a purchase by the set of individuals of the product or service during the specified period of time. The online system 140 uses one or more machine learning algorithms (e.g., a clustering algorithm, a decision tree learning algorithm, a random forest algorithm, a logistic regression algorithm, a linear regression algorithm, etc.) to train the machine learned model to predict a likelihood that an online system user presented with the content item will perform the action associated with the content item on each web site of the set of third party websites based on relationships among the identified values and strengths of the relationships.

In some embodiments, the online system 140 also trains the machine learned model to predict 340 a likelihood the viewing user will perform the action on each website of the set of third party websites using values describing features derived from information maintained by the online system 140 describing individuals who performed the action on one or more of the websites. For example, based on user-identifying information obtained by the online system 140 and stored 490 in association with received action data, the online system 140 identifies a set of online system users who performed the action associated with the content item on one or more of the set of third party websites. The online system 140 retrieves information associated with the identified users stored in association with user accounts on the online system 140 (e.g., in the user profile store 205, action log 220 and/or edge store 225) and identifies values of features derived from the user accounts describing various attributes of the users. In some embodiments, the identified values describe information shared by the users on the online system 140 and actions performed by the users on the online system 140 and/or on one or more third party systems 130. For example, the values describe demographic information about the users, declared interests of the users, connections between the users and additional online system users and/or objects, visits by the users to third party websites, and actions performed by the users on the online system 140 and/or third party websites. The online system 140 uses one or more machine learning algorithms (e.g., a clustering algorithm, a decision tree learning algorithm, a random forest algorithm, a logistic regression algorithm, a linear regression algorithm, etc.) to train the machine learned model to predict a likelihood that an online system user presented with the content item will perform the action associated with the content item on each website of the set of third party websites. For example, the predicted likelihood is based on determined relationships and strengths of relationships among combinations of the values describing the websites and actions performed on the websites derived from the action data and the values describing users who performed the actions on the websites derived from the information maintained by the online system 140.

The online system 140 uses the trained machine learned model to predict 340 a likelihood the viewing user will perform the action associated with the content item on each website of the set of third party websites using various values describing one or more attributes of the viewing user as input features. For example, upon identifying 320 the opportunity to present the content item to the viewing user, the online system 140 retrieves information stored at the online system 140 in association with an online system user account of the viewing user and derives features from the information comprising values associated with various attributes of the viewing user. In some embodiments, values associated with various attributes of the viewing user identified by the online system 140 describe information shared by the viewing user on the online system 140 and actions performed by the viewing user on the online system 140 and/or on one or more third party systems 130. For example, the values describe demographic information about the viewing user, declared interests of the viewing user, connections between the viewing user and additional online system users and/or objects, visits by the viewing user to third party websites, and actions performed by the viewing user on the online system 140 and/or third party websites.

In various embodiments, additional values used by the machine learned model as input features describe one or more attributes of the content item, the action associated with the content item, one or more websites on which the action may be performed, and/or the content providing user from whom the request to present the content item was received 300. Additional input feature values may describe information received by the online system 140 from various entities associated with third party websites that may be dynamically updated, such as information describing an availability of a specified product or service at a merchant associated with the websites. For example, using a set of input feature values describing a gender and age of the viewing user, an activity of the viewing user on the online system 140 during a specified period of time, the action associated with the content item, and an availability of a product associated with the content item at a merchant associated with each of the set of third party websites, the machine learned model outputs a predicted likelihood that the viewing user will perform the action on each website of the set of third party websites. In various embodiments, the predicted likelihood that the viewing user will perform the action on each website may be expressed as a percentage, a ratio, a score, etc.

In some embodiments, the online system 140 predicts 340 the likelihood the viewing user will perform the action associated with the content item on each website of the set of third party websites based at least in part on a measure of similarity between the viewing user and a set of individuals who performed the action on each website. In some such embodiments, the predicted likelihood that the viewing user will perform the action on each website is proportional to a degree of similarity between the viewing user and users identified by the online system 140 as individuals who performed the action on one or more of the set of third party websites. For example, based on user-identifying information stored 490 in association with the received action data, the online system 140 identifies a set of users who performed the action associated with the content item on one or more websites identified in the action data. The online system 140 retrieves information stored in association with user accounts associated with the set of users and identifies a set of attributes associated with each user of the set of users from the retrieved information. The online system 140 also retrieves information stored in association with a user account associated with the viewing user and identifies an additional set of attributes associated with the viewing user from the retrieved information. The online system 140 compares the set and additional set of attributes and computes a similarity score describing a degree of similarity between the set and additional set of attributes based on the comparison. In some such embodiments, the predicted likelihood that the viewing user will perform the action associated with the content item on each of the set of third party websites is expressed as the computed similarity score describing the degree of similarity between the set of attributes associated with users who performed the action on each website and the additional set of attributes associated with the viewing user.

Based on the predicted likelihood that the viewing user will perform the action associated with the content item on each website of the set of third party websites, the online system 140 selects 350 a third party website from the set of third party websites. In various embodiments, the online system 140 selects a web site on which there is at least a threshold predicted likelihood that the viewing user will perform the action. In some embodiments, the online system 140 selects a website from the set of third party websites associated with a greatest predicted likelihood that the viewing user will perform the action on the website. The online system 140 generates 360 the content item based on information included in the request to present the content item received 300 from the content providing user and includes a link to the selected third party website in the content item for presentation to the viewing user. For example, the online system 140 retrieves images, videos, audio and/or text included in the request to present the content item received 300 from the content providing user and generates 360 the content item including the retrieved items and the link to the selected website. In some embodiments, the online system 140 sends 370 the content item including the link to the selected website to a client device 110 associated with the viewing user for presentation to the viewing user, while in other embodiments, the content item including the link to the selected website is sent to a third party system 130 for presentation to the viewing user by the third party system 130.

If the viewing user interacts with the link to the selected third party website included in the content item, the website is presented to the viewing user. In various embodiments, if the viewing user performs the action associated with the content item on the selected third party website, action data comprising information describing the performance of the action on the website is received by the online system 140. For example, the online system 140 receives the action data in a request for a tracking pixel embedded in the website and associated with a set of parameters tracking information describing the performance of the action on the website, or from information stored at the client device 110 used to access the website, as previously described. Upon receiving the action data, the online system 140 obtains user-identifying information associated with the viewing user and/or client device 110, identifies the viewing user based on the user-identifying information, and stores 490 the action data and the user-identifying information with a reference to the viewing user for later retrieval and analysis. For example, the online system 140 retrieves and analyzes the action data and user-identifying information in association with subsequent third party website identification and selection processes, as described above.

In various embodiments, the online system 140 compiles information describing performances of the action associated with the content item on one or more websites of the set of third party websites and generates one or more metrics describing the compiled information. For example, based on information comprising the action data received by the online system 140, the online system 140 generates metrics describing an amount of individuals presented with the content item, an amount of individuals presented with one or more of the set of third party websites, an amount of individuals who performed the action associated with the content item on each of the set of third party websites, and an amount of performances of the action on each of the set of third party websites. As another example, referring to FIG. 5, the online system 140 generates metrics describing an amount 500 of presentations of each of the set of third party websites (e.g., during a specified period of time), an amount 510 of purchases of a product or service associated with the content item made on each website, an amount 520 of time between a first presentation of each website to an individual and a purchase of the item by the individual on the website, an amount 530 of requests for information about the product or service received at each website, etc. As shown in this example, the generated metrics may also describe each content publisher's share of presentations 540 of a third party website on which the action associated with the content item may be performed and share of attribution for purchases 550 of a product or service associated with the content item, received requests 560 for information about the product or service, etc.

In certain embodiments, metrics generated by the online system 140 are provided to an online system user associated with the content item (e.g., the content providing user from whom the request to present the content item was received 300) to provide the user with information from which the user may determine effectiveness of the content item for eliciting the action associated with the content item and/or to compare the effectiveness of each website of the set of third party websites for eliciting the action. In other embodiments, the metrics may be used by the online system 140 to determine an expected performance of the content item (e.g., during selection of content items eligible to be presented to an online system user). In various embodiments, metrics generated by the online system 140 based on the action data are used by the online system 140 during subsequent third party website identification and selection processes. For example, the online system 140 generates a metric describing a number of performances of the action associated with the content item on each of the set of third party websites and identifies a website on which a greatest number of performances of the action occurred based on the metric. The online system 140 selects 350 the identified website and includes a link to the website in one or more content items associated with the action for presentation to additional users of the online system 140. Hence, a content publisher may increase a likelihood the online system 140 will direct traffic to a website presented by the content publisher by providing action data to the online system 140 describing certain details about performances of the action on the website, allowing the online system 140 to determine information describing actions associated with content items performed on third party websites.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving a request from a content provider to present a content item to a plurality of users of an online system, wherein the request comprises:
the content item,
information describing an action associated with the content item that may be performed by the plurality of users, and
a plurality of websites external to the online system on which the action can be performed;
receiving a request for content from a viewing user of the plurality of users of the online system;
identifying an opportunity to present the content item to the viewing user;
for each of the plurality of websites specified by the request, predicting a likelihood that the viewing user will perform the action associated with the content item on the website based at least in part on user data for the viewing user and action data describing previous performances of the action on the plurality of websites by a plurality of other users of the online system;

selecting a website from the plurality of websites specified by the request having a highest predicted likelihood that the viewing user will perform the action associated with the content item on the website;
adding a link in a domain of the selected website to the content item, the link enabling the viewing user to perform the action on the selected website; and
sending the content item for presentation to the viewing user.

2. The method of claim 1, further comprising:
receiving a request for a tracking pixel from a client device used by an individual to access a third party website on which the action was performed, the request for the tracking pixel comprising action data describing a performance of the action on the third party website; and
responsive to receiving the request for the tracking pixel,
obtaining user-identifying information associated with the individual,
identifying the individual as an online system user based at least in part on the user-identifying information, and
storing the action data with the user-identifying information and a reference to an identified online system user.

3. The method of claim 1, wherein the likelihood that the viewing user will perform the action associated with the content item on each of the plurality of websites is predicted using a machine learned model that is trained based at least in part on the action data describing previous performances of the action on each website.

4. The method of claim 3, wherein the machine learned model is configured to receive one or more input feature values describing one or more selected from the group consisting of: the viewing user, the content item, the action associated with the content item, a website of the plurality of websites, and an online system user associated with the content item.

5. The method of claim 1, wherein predicting a likelihood that the viewing user will perform the action associated with the content item on each of the plurality of websites is further based at least in part on a measure of similarity between the viewing user and a set of individuals who performed the action on each website.

6. The method of claim 1, wherein the action data comprises information describing one or more selected from the group consisting of: a presentation of a third party website of the plurality of websites to an individual, a request for information associated with the content item received at the third party website, and a purchase of a product or service associated with the content item made on the third party website.

7. The method of claim 1, wherein the request to present the content item to the plurality of users of the online system further comprises a description of a product or service associated with a content providing user of the online system who provided the request to the online system.

8. The method of claim 7, wherein each of the plurality of websites external to the online system publishes content comprising an offer to sell the product or service.

9. The method of claim 8, wherein predicting the likelihood that the viewing user will perform the action associated with the content item on each of the plurality of websites is further based at least in part on data received by the online system describing an availability of the product or service at a merchant associated with at least one of the plurality of webpages.

10. The method of claim 1, wherein the selected website is associated with a highest predicted likelihood that the viewing user will perform the action associated with the content item on the website.

11. The method of claim 1, wherein the action associated with the content item comprises one or more of: a purchase of a product or service associated with the content item and a request for information about the product or service.

12. The method of claim 1, further comprising:
generating a metric describing a number of performances of the action on at least one of the plurality of websites based at least in part on the action data; and
sending the metric for presentation to an online system user associated with the content item.

13. A method comprising:
receiving a request from a content provider to present a content item to another user of an online system, wherein the request comprises the content item and a plurality of websites external to the online system on which an action associated with the content item can be performed;
receiving a request for content from a viewing user of the online system;
identifying an opportunity to present the content item to the viewing user;
identifying a set of websites from the plurality of websites based at least in part on action data received by the online system, the action data describing previous performances of the action on each website of the set of websites by a set of online system users;
for each website of the set of websites, predicting a likelihood that the viewing user will perform the action by applying user data of the viewing user to a machine learned model, wherein the machine learned model is trained based at least in part on the action data;
selecting a website of the set of websites associated with a highest predicted likelihood that the viewing user will perform the action on the website;
adding a link for the selected website to the content item, the link enabling the viewing user to perform the action on the selected website; and
sending the content item for presentation to the viewing user.

14. The method of claim 13, further comprising:
receiving a request for a tracking pixel from a client device used by an individual to access a third party website on which the action was performed, the request for the tracking pixel comprising action data describing a performance of the action on the third party website; and
responsive to receiving the request for the tracking pixel,
obtaining user-identifying information associated with the individual,
identifying the individual as an online system user based at least in part on the user-identifying information, and
storing the action data with the user-identifying information.

15. The method of claim 13, wherein the action data comprises information describing one or more selected from the group consisting of: a presentation of a third party website of the set of websites to an individual, a request for information associated with the content item received at the third party website, and a purchase of a product or service associated with the content item made on the third party website.

16. The method of claim 13, wherein the action associated with the content item comprises one or more of: a purchase of a product or service associated with the content item and a request for information about the product or service.

17. A computer program product comprising a computer readable storage medium having instructions encoded thereon that, when executed by a processor, cause the processor to:
- receive a request from a content provider to present a content item to a plurality of users of an online system, wherein the request comprises:
  - the content item,
  - information describing an action associated with the content item that may be performed by the plurality of users, and
  - a plurality of websites external to the online system on which the action can be performed;
- receive a request for content from a viewing user of the plurality of users of the online system;
- identify an opportunity to present the content item to the viewing user;
- for each of the plurality of websites specified by the request, predict a likelihood that the viewing user will perform the action associated with the content item on the website based at least in part on user data for the viewing user and action data describing previous performances of the action on the plurality of websites by a plurality of other users of the online system;
- select a website from the plurality of websites specified by the request having a highest predicted likelihood that the viewing user will perform the action associated with the content item on the website;
- add a link in a domain of the selected website to the content item, the link enabling the viewing user to perform the action on the selected website; and
- send the content item for presentation to the viewing user.

18. The computer program product of claim 17, wherein the computer readable storage medium has instructions encoded thereon that, when executed by a processor, further cause the processor to:
- receive a request for a tracking pixel from a client device used by an individual to access a third party website on which the action was performed, the request for the tracking pixel comprising action data describing a performance of the action on the third party website; and
- responsive to receiving the request for the tracking pixel,
  - obtain user-identifying information associated with the individual,
  - identify the individual as an online system user based at least in part on the user-identifying information, and
  - store the action data with the user-identifying information and a reference to an identified online system user.

19. The computer program product of claim 17, wherein the likelihood that the viewing user will perform the action associated with the content item on each of the plurality of websites is predicted using a machine learned model that is trained based at least in part on the action data describing previous performances of the action on each website.

20. The computer program product of claim 19, wherein the machine learned model is configured to receive one or more input feature values describing one or more selected from the group consisting of: the viewing user, the content item, the action associated with the content item, a website of the plurality of websites, and an online system user associated with the content item.

* * * * *